United States Patent
Osaka (10) Patent No.: US 8,812,053 B2
(45) Date of Patent: Aug. 19, 2014

(54) MOBILE ELECTRONIC DEVICE AND MOBILE PHONE

(75) Inventor: Masashi Osaka, Yokohama (JP)

(73) Assignee: Kyocera Corporation, Kyoto (JP)

( * ) Notice: Subject to any disclaimer, the term of this patent is extended or adjusted under 35 U.S.C. 154(b) by 175 days.

(21) Appl. No.: 13/504,151

(22) PCT Filed: Oct. 15, 2010

(86) PCT No.: PCT/JP2010/068160
§ 371 (c)(1), (2), (4) Date: Apr. 26, 2012

(87) PCT Pub. No.: WO2011/052406
PCT Pub. Date: May 5, 2011

(65) Prior Publication Data
US 2012/0214546 A1 Aug. 23, 2012

(30) Foreign Application Priority Data
Oct. 28, 2009 (JP) .................................. 2009-248217

(51) Int. Cl.
*H04M 1/02* (2006.01)

(52) U.S. Cl.
USPC .......................... 455/556.1; 348/177; 353/119

(58) Field of Classification Search
CPC ..... H04W 64/00; G06K 19/0723; H02J 5/005
USPC ............................... 455/456.1, 41.1; 307/104
See application file for complete search history.

(56) References Cited

U.S. PATENT DOCUMENTS

| 6,310,662 B1 | 10/2001 | Sunakawa et al. |
| 2010/0081378 A1* | 4/2010 | Kawamura .................. 455/41.1 |

FOREIGN PATENT DOCUMENTS

| JP | 8009309 A | 1/1996 |
| JP | 10200836 A | 7/1998 |
| JP | 2002261889 A | 9/2002 |
| JP | 2003-258942 A | 9/2003 |
| JP | 2003324669 A | 11/2003 |
| JP | 2005039558 A | 2/2005 |
| JP | 2005-236746 A | 9/2005 |
| JP | 2006350174 A | 12/2006 |
| JP | 2007096542 A | 4/2007 |
| JP | 2007-124347 A | 5/2007 |
| JP | 2009-125403 A | 6/2009 |

OTHER PUBLICATIONS

International Search Report and Written Opinion for PCT/JP2010/068160, dated Nov. 16, 2010.
Office Action corresponding to JP2009-248217, dated Mar. 5, 2013.

* cited by examiner

*Primary Examiner* — Phuoc H Doan
(74) *Attorney, Agent, or Firm* — Lowe Hauptman & Ham, LLP

(57) ABSTRACT

According to the present invention, a mobile electronic device includes: a housing; a projecting unit for projecting an image, the projecting unit being mounted on the housing; a detecting unit for detecting a positional relation between the projecting unit and a projection surface on which an image projected by the projecting unit is to be displayed; a position changing unit for changing a position of the housing; and a control unit for controlling the position changing unit on the basis of the positional relation between the projecting unit and the projection surface detected by the positional-relation detecting unit.

17 Claims, 6 Drawing Sheets

MOBILE ELECTRONIC DEVICE AND MOBILE PHONE

CROSS-REFERENCE TO RELATED APPLICATION

This application is a National Stage of PCT International Application Ser. No. PCT/JP2010/068160 filed on Oct. 15, 2010, and which is based upon and claims the benefit of priority from Japanese Patent Application No. 2009-248217, filed on Oct. 28, 2009.

FIELD

The present disclosure relates to a mobile electronic device and a mobile phone that include an image projecting unit for projecting an image.

BACKGROUND

Conventionally, there are devices known as projectors that project an image on a wall surface or a screen. The most common projectors are known as stationary projectors, which receive power from a utility power supply and are fixed to a predetermined position when they operate. Stationary projectors project, while they are fixed, an image onto a fixed position on a wall or a screen.

If a projector, which projects an image, is set in such a manner that the light emitting unit of the projector is not perfectly facing the projection surface, such as a wall or a screen, that is, the image is projected at a projection angle with the light emitting unit being tilted with respect to the projection surface, a trapezoidal image angled in accordance with the projection angle is displayed on the projection surface. For this reason, software-based keystone correction is performed.

A projector device is described in patent literature 1 that automatically corrects the position of the projector by using a tilt sensor. Moreover, a projector is described in patent literature 2 that calculates the tilt angle by using a computing unit and performs keystone correction by using a software-based keystone correcting unit.

Portable projectors have been proposed recently that are small and easy to carry. A mobile terminal with a projector function, for example, is described in patent literature 3. This mobile terminal includes an upper cabinet, a lower cabinet, a hinge member that rotatably joins the upper cabinet and the lower cabinet together, a lens, and a light source.

CITATION LIST

Patent Literature

Patent literature 1: Japanese Patent Application Laid-open No. 2003-324669
Patent literature 2: Japanese Patent Application Laid-open No. 2005-039558
Patent literature 3: Japanese Patent Application Laid-open No. 2007-096542

Technical Problem

Even though a portable projector is used, if the light projecting direction is not perfectly facing the projection surface, i.e., the angle between (the center of) the light projecting direction and the projection surface on a horizontal plane is not 90 degrees, distortion occurs in the projected image because the distance to the image on the left side is different from the distance to the image on the right side. To deal with this, according to patent literature 3, vertical keystone correction is performed when it is detected that a mobile terminal is placed on a desk or the like. However, patent literature 3 does not mention a solution to a situation where the light projecting direction is not perfectly facing a projection surface in the left-and-right direction, i.e., the angle of incidence of light onto the projection surface with respect to a horizontal plane is not a right angle, i.e., the image is projected at a slant. For this reason, when an image is projected obliquely with respect to a horizontal plane, the image is projected uncorrected and a distorted image is projected. If a distorted image is projected, it is difficult to see the image.

Although patent literature 1 relates to automatic correction of the angle of a stationary projector by using a tilt sensor, it is difficult to apply, without any modifications, the position correcting mechanism used in a stationary projector to a mobile electronic device. Moreover, the device described in patent literature 1 can correct the angle between the device itself and the horizontal direction; however, patent literature 1 does not mention a situation where the projecting direction is oblique against the projection surface on a horizontal plane.

As described above, according to patent literature 2, the computing unit calculates the tilt angle of a projector with respect to the projection surface and the keystone correcting unit performs keystone correction. However, a software-based keystone correcting process cannot work properly when the tilt angle of the projector with respect to the projection surface is at a predetermined limit or greater. Therefore, patent literature 2 cannot deal with a situation where an image is projected at a projection angle greater than the limit of keystone correction.

For the foregoing reasons, there is need for a mobile electronic device and a mobile phone capable of projecting an easy-to-view image on a projection surface.

SUMMARY

According to an aspect, a mobile electronic device includes: a housing; a projecting unit for projecting an image, the projecting unit being mounted on the housing; a detecting unit for detecting a positional relation between the projecting unit and a projection surface on which an image projected by the projecting unit is to be displayed; a position changing unit for changing a position of the housing; and a control unit for controlling the position changing unit on the basis of the positional relation between the projecting unit and the projection surface detected by the positional-relation detecting unit.

According to another aspect, the position changing unit is a rotating unit for rotating, while maintaining the housing being on a supporting surface, the housing around a rotating axis that extends in a direction that crosses the supporting surface.

According to another aspect, the detecting unit is an imaging unit for taking a picture of an image to be projected by the projecting unit onto the projection surface, and the control unit performs a first correcting process to process an image to be projected by the projecting unit onto the projection surface into a first required image, by controlling a drive of the rotating unit on the basis of an image taken by the imaging unit such that the drive of the rotating unit causes the housing to be rotated.

According to another aspect, the detecting unit is a distance measuring unit that measures a first distance between the projecting unit and the projection surface on one side when an angle of a projecting direction of the projecting unit with respect to the center on a direction parallel to the supporting surface is substantially equal to an angle at one end of a field in which the projecting unit can project an image and measures a second distance between the projecting unit and the projection surface on the other side when an angle of a projecting direction of the projecting unit with respect to the center on a direction parallel to the supporting surface is substantially equal to an angle at the other end of the field in which the projecting unit can project an image, and the control unit controls the rotating unit such that the difference between the first distance and the second distance measured by the distance measuring unit is reduced.

According to another aspect, the rotating unit is inside the housing, and causes the housing to be rotated by rotating a rotary body.

According to another aspect, the rotating unit also has an announcement function of giving an announcement by rotating the rotary body to vibrate the housing, and the control unit periodically reverses a rotating direction of the rotary body to give the announcement.

According to another aspect, the mobile electronic device further includes a communication unit, and when the communication unit receives an incoming call, the control unit activates the announcement function of the rotating unit.

According to another aspect, the mobile electronic further includes a protruding portion on a first main surface that faces the supporting surface when the housing is placed on the supporting surface, and the protruding portion is the center of rotation when the housing is rotated.

According to another aspect, the housing further includes a sound emitting unit for outputting a sound, and the sound emitting unit is arranged such that the sound emitting is in a space to be formed between the first main surface and the supporting surface when the housing is placed on the supporting surface.

According to another aspect, the control unit performs a second correcting process to correct either or both of image data and a signal generated from the image data in such a manner that an image to be projected by the projecting unit onto the projection surface is processed into a second required image, before the projecting unit performs projection.

According to another aspect, the control unit performs the second correcting process after performing the first correcting process.

According to another aspect, he first required image is a quadrangular image in which a quadrangular image to be projected onto the projection surface is entirely projected and the ratio between two sides of the projected quadrangular image that extend substantially perpendicular to the supporting surface is equal to or less than a first required value.

According to another aspect, the first required image is a quadrangular image in which a quadrangular image to be projected onto the projection surface is entirely projected and the ratio between two sides of the projected quadrangular image that extend substantially perpendicular to the supporting surface is equal to or less than a first required value, and the second required image is a quadrangular image in which a quadrangular image to be projected onto the projection surface is entirely projected and the ratio between two sides of the projected quadrangular image that extend substantially perpendicular to the supporting surface is equal to or greater than 1 and less than the first required value.

According to another aspect, the second required image is a quadrangular image in which a quadrangular image to be projected onto the projection surface is entirely projected and the ratio between two sides of the projected quadrangular image that extend substantially parallel to the supporting surface is equal to or less than a second required value.

According to another aspect, a mobile phone includes: a housing to be placed on a supporting surface; a communication unit that is mounted on the housing; a vibrating unit for rotating an eccentric rotary body to vibrate the housing; a telephone unit for makes a telephone call when the communication unit receives an incoming call; and a control unit for performing control of rotation of the rotary body of the vibrating unit. The control unit moves the housing by rotating the rotary unit of the vibrating unit, and the control unit controls a moving direction of the housing that is on the supporting surface by controlling a rotating direction of the rotary unit.

According to another aspect, when the communication unit receives an incoming call, the control unit rotates the rotary body by switching rotating directions alternately, thereby vibrating the housing.

Advantageous Effects of Invention

The advantages are that one embodiment of the invention provides a mobile electronic device and a mobile phone capable of projecting an easy-to-view image on a projection surface.

DESCRIPTION OF EMBODIMENTS

The present invention will be explained in detail below with reference to the accompanying drawings. The following description is not intended to limit the invention. The components in the following description include those that can be easily thought of by persons skilled in the art, and substantially equivalents or those in an equivalent scope. Hereinafter, although a mobile phone will be described as an example of a mobile electronic device, the application of the invention is not limited to mobile phones. For example, the invention can also be applied to PHSs (Personal Handyphone Systems), PDAs, portable navigation devices, notebook personal computers, gaming devices, or the like.

Figure 1:
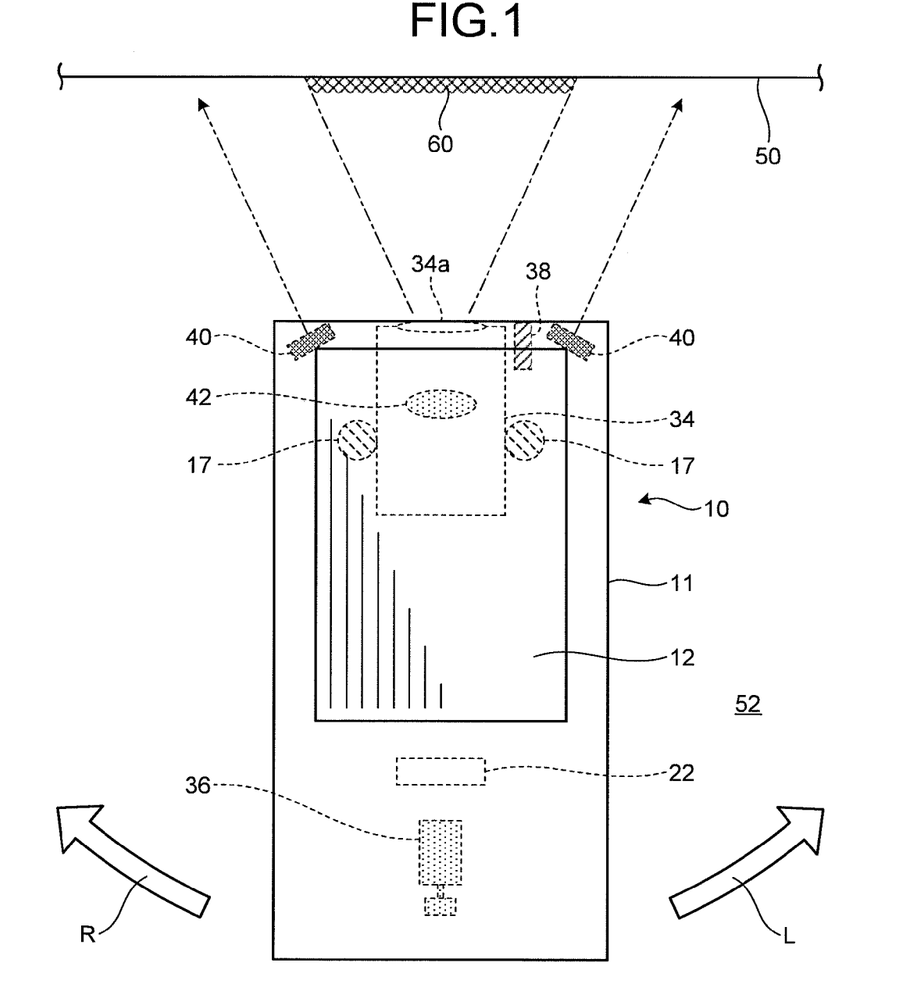
FIG. 1 is a plan view of the configuration of a mobile electronic device according to an embodiment of the present invention.
Figure 2:
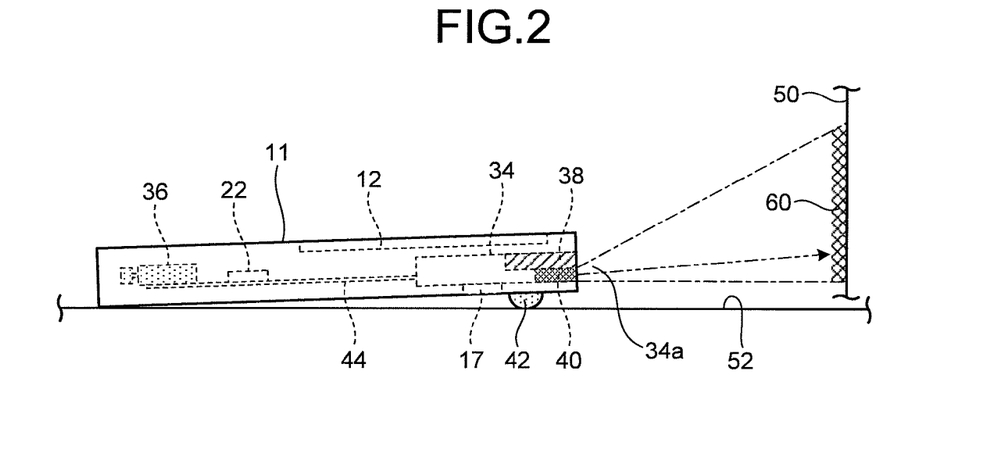
FIG. 2 is a side view of the mobile electronic device illustrated in FIG. 1 viewed from a side surface direction.

First of all, the outer configuration of a mobile electronic device will be explained. FIG. 1 is a plan view of the configuration of a mobile electronic device according to an embodiment of the present invention; FIG. 2 is a side view of the mobile electronic device illustrated in FIG. 1 viewed from a side surface direction.

The mobile electronic device 10 is a mobile phone equipped with a wireless communication function. The mobile electronic device 10 is a straight-shaped mobile phone in which each unit is accommodated inside one box-shaped housing 11. As illustrated in FIGS. 1 and 2, the mobile electronic device 10 is set in such a manner that the housing 11 is placed on a horizontal plane 52 and a surface of the housing 11 on which a light emitting unit 34 of a projector 34a, which will be described later, is arranged is facing a projection surface 50. Moreover, in the present embodiment, a first main surface of the housing 11 (a surface opposite to a surface on which a later-described display 12 is provided, the surface is also called, hereinafter, bottom surface) is facing the horizontal plane 52. Although, in the present embodiment, the housing 11 is one box-shaped housing, it can be a foldable housing that includes two components hinged together or a slidable housing that includes two components sliding along each other. A housing that includes three or more components jointed together can also be used.

The display 12 is provided on a top surface of the housing 11 (one of two largest surfaces of the housing 11) as a display unit. The display 12 displays a certain image as a standby screen when the mobile electronic device 10 is in standby and displays a menu screen for assistance of operations of the mobile electronic device 10.

The light emitting unit 34a of the projector 34 is provided on a front end of the housing 11 (a surface (side surface) that is adjacent to a lateral side of the top surface of the housing 11 and that is closer to the display 12) to project an image. The projector 34 projects an image 60 from the light emitting unit 34a onto the projection surface 50, which is a wall, a screen, etc., perpendicular to the horizontal plane 52.

Distance measuring sensors 40 are also provided on the front end of the housing 11 as a detecting unit that detects the positional relation between the projector 34 and the projection surface 50. One of the distance measuring sensors 40 is provided on each of the left side and the right side of the projector 34 (both sides extending in the longitudinal direction of the surface on which the light emitting unit 34a is provided). Moreover, each of the distance measuring sensors 40 is set in such a manner that direction in which the distance to the projection surface 50 is measured, i.e., distance measuring direction (indicated by arrow with dashed-two dotted line of the figure) becomes substantially parallel to the left side or the right side of the angle of field of view from the light emitting unit 34a of the projector 34 (indicated by dashed-one dotted line). In other words, the distance measuring sensor 40 that is on the right side of the projector 34 measures the distance to the projection surface 50 in a direction that is substantially parallel to the right side of the angle of field of view from the light emitting unit 34a of the projector 34. The distance measuring sensor 40 that is on the left side of the projector 34 measures the distance to the projection surface 50 in a direction that is substantially parallel to the left side of the angle of field of view from the light emitting unit 34a of the projector 34.

A camera 38 is also provided on the front end of the housing 11 to take a picture of the image 60 that is projected from the light emitting unit 34a of the projector 34 onto the projection surface 50. The camera 38 takes a picture of the image at an angle of field wider than the angle of field of view. To more accurately take a picture of the shape of the projected image 60, the camera 38 is preferably arranged near the light emitting unit 34a.

A supporting point 42 is provided on the first main surface of the housing 11 near the front end (near the end that is near the side surface on which the light emitting unit 34a of the projector 34 is provided) substantially at the center in the lateral direction of the top surface in such a manner that it protrudes downward (in a direction perpendicular to the bottom surface) from the housing 11. Because of the presence of the supporting point 42, the housing 11 is set in such a manner that the supporting point 42 and a side of the first main surface that is adjacent to a side surface opposite to the side surface on which the light emitting unit 34a is provided are in contact with the horizontal plane 52. The other part of the housing 11 is above the horizontal plane 52 (off the horizontal plane 52).

A speaker 17 is arranged on the bottom surface of the housing 11 near the supporting point 42 as a sound emitting unit. The speaker 17 directly outputs a ringingtone and a sound during a handfree talk or the like. Because the speaker 17 is above the horizontal plane 52, it is a certain distance away from the horizontal plane 52. When the housing 11 is placed on the horizontal plane 52, because a space is formed between the horizontal plane 52 and the speaker 17 by the presence of the supporting point 42, a sound is output without been covered by the horizontal plane 52.

A vibration motor 36 is arranged near a back end of the housing 11 (near an end that is opposite to the side surface on which the light emitting unit 34a of the projector 34 is provided) substantially at the center in the lateral direction of the top surface. The vibration motor 36 is an eccentric motor that has an eccentric weight attached to a rotary shaft. The rotary shaft extends in a direction that passes through the supporting point 42. The vibration motor 36 can rotate in both directions by switching the rotating direction of the rotary shaft. When rotating in one direction, the vibration motor 36 rotates the housing 11 in a direction indicated by an outlined arrow R. When rotating in the other direction, the vibration motor 36 rotates the housing 11 in a direction indicated by an outlined arrow L. When the housing 11 is rotating, the center of rotation lies, basically, at the supporting point 42. It is possible to predetermine the relation between the rotating direction of the vibration motor 36 and the rotating direction of the housing.

As illustrated in FIG. 2, a substrate 44 is arranged inside the housing 11, and the above components, such as the speaker 17, the projector 34, the vibration motor 36, the camera 38, and the distance measuring sensors 40 are attached thereto. A later-described control unit 22 that integrally controls operations of the mobile electronic device 10 is also attached to the substrate 44.

Figure 3:
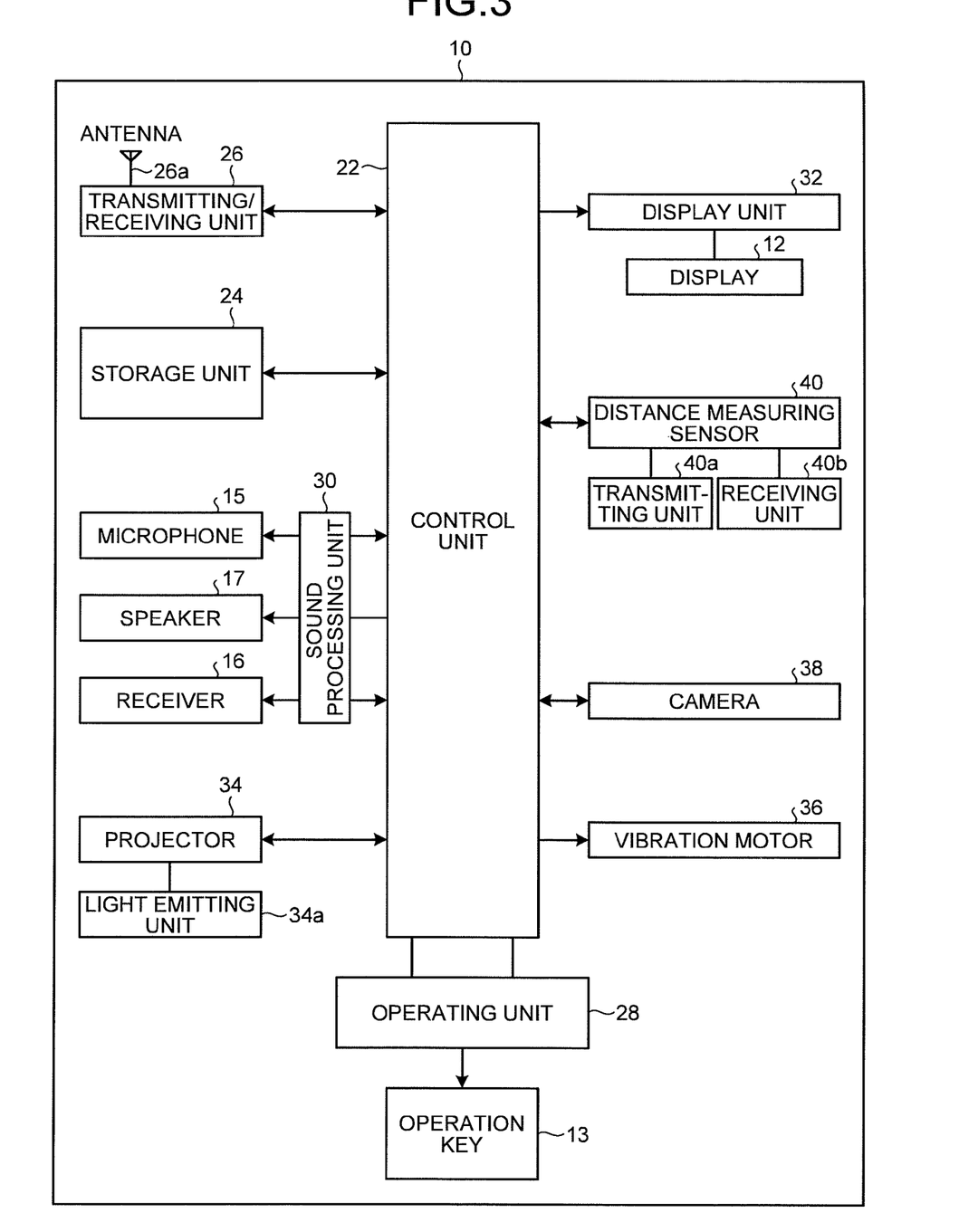
FIG. 3 is a block diagram of the configuration of the mobile electronic device according to the present embodiment.

FIG. 3 is a block diagram of the schematic configuration of the mobile electronic device according to the present embodiment. The functional configuration of the mobile electronic device 10 will be explained below with reference to FIG. 3. As illustrated in FIG. 3, the mobile electronic device 10 includes the control unit 22, a storage unit 24, a transmitting/receiving unit 26, an operating unit 28, a sound processing unit 30, a display unit 32, the projector 34, the vibration motor 36, the camera 38, and the distance measuring sensors 40.

The control unit 22 is a processing unit that integrally controls general operations of the mobile electronic device 10, such as a CPU (Central Processing Unit) and a MPU (Micro Processor Unit). In other words, the control unit 22 controls operations of the transmitting/receiving unit 26, the sound processing unit 30, the display unit 32, etc., so that various processes of the mobile electronic device 10 are performed in a proper order in accordance with operations of the operating unit 28 and software stored in the storage unit 24 of the mobile electronic device 10. The processes of the mobile electronic device 10 include, for example, a voice call made via a line switching network, composing, transmitting, and receiving an electronic mail, and browsing a Web (World Wide Web) site on the Internet. Operations of the transmitting/receiving unit 26, the sound processing unit 30, the display unit 32, etc., include, for example, transmitting and receiving a signal by the transmitting/receiving unit 26, inputting and outputting a sound by the sound processing unit 30, and displaying an image by the display unit 32.

More particularly, the control unit 22 performs processes based on programs stored in the storage unit 24 (for example, operating system programs, application programs, etc.). In other words, the control unit 22 sequentially reads command codes of a program, such as an operating system program and an application program, from the storage unit 24 and then performs processes.

The control unit 22 has a function of performing two or more application programs. Application programs performed by the control unit 22 include, for example, an application program used for controlling driving of the projector and rotational movement of the housing 11 by using the vibration motor 36, an application program used for detecting, as described later, the positional relation between the housing 11 and the projection surface by using the camera 38 and the distance measuring sensors 40, an application program used for performing keystone correction, an image reproduction application program used for reproducing a still image and a video, a game application program used for activating various games, etc.

The storage unit 24 stores therein software and data that are used when the control unit 22 performs processes. The storage unit 24 stores therein, for example, a task that activates the abovementioned application program used for controlling the driving of the projector 34, a task that activates the application program used for controlling rotational movement of the housing 11 by using the vibration motor 36, a task that activates the application program used for detecting the positional relation between the housing 11 and the projection surface 50 by using the camera 38 and the distance measuring sensors 40, a task that activates the image reproduction application program used for reproducing a still image and a video, and a task that activates various game application programs.

The storage unit 24 stores therein not only these tasks but also, for example, communications, downloaded sound data, software that is used when the control unit 22 controls the storage unit 24, an address book that stores and manages phone numbers, mail addresses, etc., of intended parties, a sound file of dialing tones, ringing tones, etc., temporary data that is used during software processing, etc. Computer programs and temporal data that are used during software processing are temporarily stored by the control unit 22 in a work area that is assigned to the storage unit 24. The storage unit 24 includes, for example, a nonvolatile storage device (nonvolatile semiconductor memory, such as ROM: Read Only Memory, a hard disk device, etc.), a read/write storage device (for example, SRAM: Static Random Access Memory, DRAM: Dynamic Random Access Memory), etc.

The transmitting/receiving unit 26 includes an antenna 26a. The transmitting/receiving unit 26 establishes a wireless signal path between the mobile electronic device 10 and a base station based on a CDMA method or the like via a channel that is assigned by the base station, thereby making telephone communications and information communications with the base station.

The operating unit 28 includes, for example, operation keys 13 that are assigned with various functions, such as a power supply key, a call key, numeric keys, character keys, direction keys, an enter key, a call key, etc. When these keys are entered by an operation of a user, a signal that corresponds to the content of the operation is generated. The generated signal is then input to the control unit 22 as an instruction from the user. Although the housing 11 is provided with the operation keys 13 as an operating unit, because FIGS. 1 and 2 illustrate the inner configuration of the housing, they are not illustrated in FIGS. 1 and 2.

The sound processing unit 30 processes a sound signal that is input to a microphone 15 and a sound signal that is output from a receiver 16 and the speaker 17. In other words, the sound processing unit 30 amplifies a sound input from the microphone 15, then performs AD conversion (Analog Digital conversion), then performs signal processing, such as encoding, thereby converting the sound to digital sound data, and then outputs the digital sound data to the control unit 22. Upon receiving sound data from the control unit 22, the sound processing unit 30 decodes the sound data, then performs DA conversion (Digital Analog conversion), then performs processing, such amplifying, thereby converting the data to an analog sound signal, and then outputs the analog sound signal to the receiver 16 or the speaker 17.

The display unit 32 includes a display panel (the abovementioned display 12 or the like) that is a liquid crystal display (LCD, Liquid Crystal Display), an organic EL (Organic Electro-Luminescence) panel, or the like. The display unit 32 displays, on the display panel, a video in accordance with video data received from the control unit 22 and an image in accordance with image data received from the control unit 22. The display unit 32 can include not only the display 12 but also, for example, a sub display.

The projector 34 is an image projecting system for projecting an image. The projector 34 includes, as described above, the light emitting unit 34a on the front end of the housing 11 to project an image. An image is projected from the light emitting unit 34a of the projector 34 to the projection surface 50. In other words, the projector 34 emits light of an image, thereby projecting an image on a certain region (projection region) of the projection surface 50, such as a wall surface or a screen, which is facing the surface on which the light emitting unit 34a of the housing 11 is provided. The operations of the projector 34 are controlled by the control unit 22. The projector 34 projects various videos received from the control unit 22, for example, movies and presentation materials, and displays them on the projection region.

The projector 34 includes a light source and an optical system that switches, in accordance with image data, whether or not light emitted from the light source is to be projected. For example, the projector 34 can be a projector that includes, as the light source, a halogen light, an LED light source, or an LD light source and, as the optical system, an LCD (Liquid Crystal Display) or a DMD (Digital Micro-mirror Device). With this configuration, an image is projected on the entire projection region by arranging the optical system to cover the entire projection region in associated with each pixel and switching the optical system or light emitted from the light source on and off in accordance with an image. Alternatively, the projector 34 can be a projector that includes, as the light source, a laser light and, as the optical system, a switching element that switches whether to allow light emitted from the light source to pass through and a mirror that reflects light, after passed through the switching element, for raster scanning. With this configuration, an image is projected on the projection region by changing the angle of light emitted from the laser light using the mirror so that the entire projection region is scanned with light emitted from the light source.

As described above, the vibration motor 36 is arranged near the back end of the housing 11 substantially at the center in the lateral direction of the top surface. The vibration motor 36 is arranged such that the rotary shaft extends in a direction that passes through the supporting point 42. The vibration motor 36 is an eccentric motor that has an eccentric weight attached to the rotary shaft. When the rotary shaft attached with an eccentric weight is rotated, a vibration is generated and the housing 11 vibrates. For an announcement of an incoming call, the vibration motor 36 can give a notice of the incoming call not by outputting a sound but by vibrating the housing 11. Moreover, as described above, the vibration motor 36 rotates the housing 11 to an arbitrary angle by vibrating the rotary shaft.

As described above, the camera 38 is an imaging system that is arranged near the light emitting unit 34a of the projector 34 to acquire an image of a region including the projection region. In other words, the camera 38 acquires an image in a direction toward which the projector 34 emits light. The camera 38 is an imaging system that takes an image at an angle of field wider than the angle of field of view at which the projector 34 projects an image. The camera 38 can take an image of a region wider than the projection region where the projector 34 projects an image. By comparing an image that is projected on the projection surface 50 and taken by the camera 38 with a first required image that is stored in the storage unit 24 as an ideal image, the control unit 22 can determine whether the light emitting unit 34a of the projector 34 is perfectly facing the projection surface 50 and, if it is tilted, to which side and to what extend it is tilted.

The distance measuring sensors 40 are measuring instruments that measure the distance to the projection surface 50 that is in a predetermined direction (in the present embodiment, direction toward which the projector 34 emits light). As described above, one of the distance measuring sensors 40 is arranged on each of the left side and the right side of the projector 34. Each of the distance measuring sensors 40 includes a transmitting unit 40a that emits a measuring wave, such as an infrared ray, an ultrasonic wave, and a laser light and a receiving unit 40b that receives the measuring wave. With the distance measuring sensors 40, a measuring wave that is emitted from the transmitting unit 40a and then reflected from a target object is received by the receiving unit 40b. Each of the distance measuring sensors 40 calculates the distance between the distance measuring sensor 40 and the target object based on the intensity of the measuring wave received by the receiving unit 40b, the angle of incidence of the measuring wave, and/or the time between when the transmitting unit 40a transmits the measuring wave and when the receiving unit 40b receives the measuring wave. The distance measuring sensors 40 are arranged such that the left side and the right side of the angle of field of view from the light emitting unit 34a of the projector 34 are substantially parallel to the respective distance measuring directions. Therefore, the distance measuring sensors 40 can determine whether the light emitting unit 34a of the projector 34 is perfectly facing the projection surface 50 and, if it is tilted, to which side and to what extend it is tilted. The mobile electronic device 10 is basically configured as described above.

Figure 4:
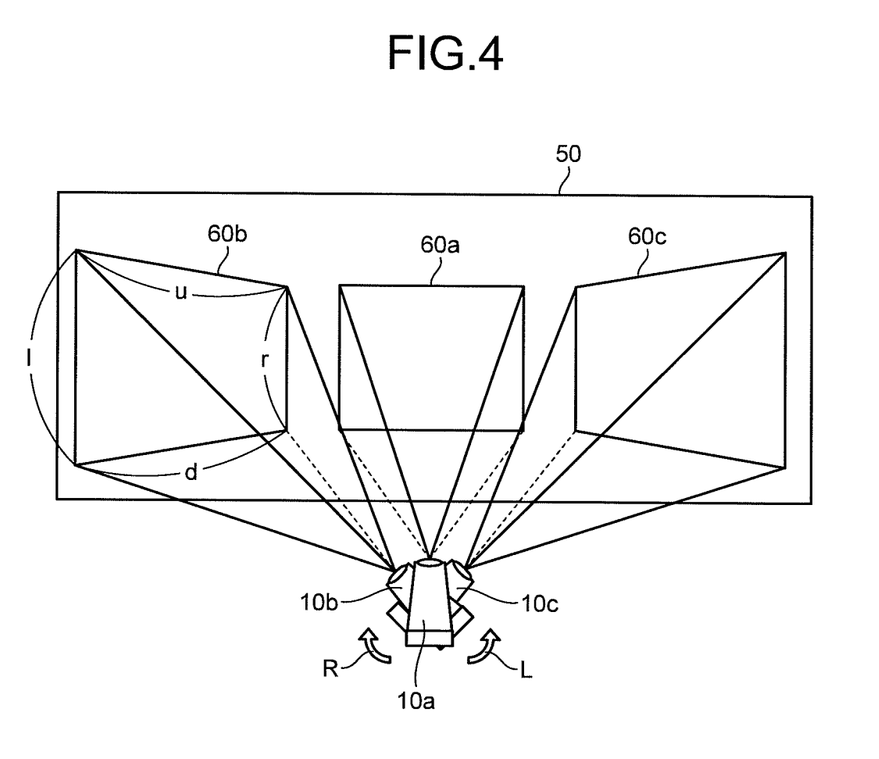
FIG. 4 is a diagram that illustrates the relation between the projection angle of a projector to a projection surface and a projected image.

Then, the operations of the mobile electronic device 10 will be explained with reference to FIG. 4. FIG. 4 is a diagram that illustrates the relation between the projection angle of the projector to the projection surface and a projected image. As described above, the mobile electronic device 10 projects an image from the light emitting unit 34a of the projector 34 onto the projection surface 50. When viewed from the top surface of the housing 11, a mobile electronic device 10a is arranged such that the surface on which the light emitting unit 34a is provided is facing the projection surface 50. When the mobile electronic device 10a is set as described above, the angle between the center of light emitted from the light emitting unit 34a and the projection surface 50 is 90 degrees. Therefore, a projected image 60a is a substantially rectangular image.

A mobile electronic device 10b is rotated a certain angle in a counterclockwise direction from the mobile electronic device 10a, as viewed the top surface of the housing 11. When the mobile electronic device 10b is set as described above, the angle between the center of light emitted from the light emitting unit 34a and the projection surface 50 is less than 90 degrees. Therefore, a side r of a projected image 60b, which is a side closer to the mobile electronic device 10b, is shorter than a side 1, which is a side farther away from the mobile electronic device 10b, and the projected image is a trapezoidal image.

A mobile electronic device 10c is rotated a certain angle rotated in a clockwise direction from the mobile electronic device 10a, as viewed the top surface of the housing 11. When the mobile electronic device 10c is set as described above, the angle between the center of light emitted from the light emitting unit 34a and the projection surface 50 is less than 90 degrees. Therefore, the side 1 of a projected image 60c, which is a side closer to the mobile electronic device 10c, is shorter than the side r, which is a side farther away from the mobile electronic device 10c, and the projected image is a trapezoidal image.

Regarding this point, the mobile electronic device 10 detects the positional relation between the attitude of the housing 11 and the projection surface 50 based on values measured by the distance measuring sensors 40 or an image acquired by the camera 38. The mobile electronic device 10 then drives (rotates) the vibration motor 36 based on the detected result and controls the angle of the housing 11 such that a more appropriate image is projected on the projection surface 50. Detecting the positional relation between the attitude of the housing 11 and the projection surface 50 indicates, more specifically, detecting the angle between the surface on which the light emitting unit 34a is arranged and the projection surface 50 or the angle between the center of light emitted from the light emitting unit 34a and the projection surface 50 on a surface parallel to the top surface of the housing 11 (in the present embodiment, a horizontal plane). For example, when the mobile electronic device 10 is at the attitude of the mobile electronic device 10b, the vibration motor 36 is driven to rotate the housing 11 in the direction indicated by the outlined arrow R closer to the attitude of the mobile electronic device 10a. In contrast, if the mobile electronic device 10 is at the attitude of the mobile electronic device 10c, the vibration motor 36 is driven to rotate the housing 11 in the direction indicated by the outlined arrow L closer to the attitude of the mobile electronic device 10a.

As described above, the mobile electronic device 10 can rotate in both directions on the horizontal plane (supporting surface) 52 by rotating the vibration motor 36. Therefore, the mobile electronic device 10 can change the projecting direction of the projector 34, which is mounted on the housing 11, and can project an image in a desired direction onto the projection surface 50.

Figure 5:
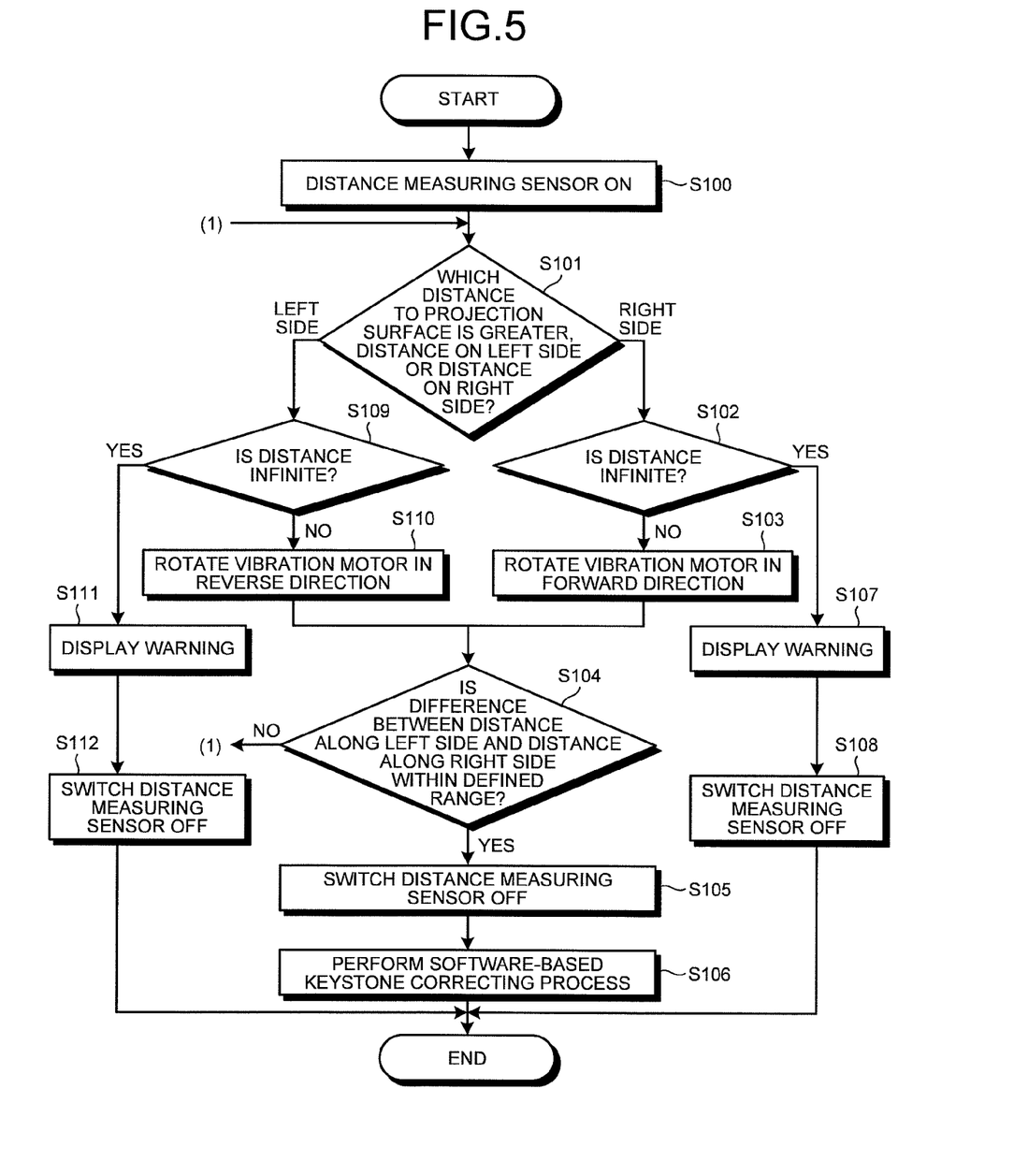
FIG. 5 is a flowchart of an example of an operation of the mobile electronic device.

Then, an operation of the mobile electronic device 10, more particularly, a control operation (hereinafter, also called "first correcting process") in which the housing 11 is rotated to a position possible to perform a software-based keystone correcting process (hereinafter, also called "second correcting process") will be explained with reference to FIG. 5. FIG. 5 is a flowchart of an example of the operation of the mobile electronic device. The flowchart illustrated in FIG. 5 is an example of control of rotational movement of the housing 11 in accordance with a measuring result of the distance measuring sensors 40. The right-and-left direction in the present embodiment is the right-and-left direction viewed from the top surface of the housing 11 toward the housing 11. When the mobile electronic device 10 of the present embodiment rotates the vibration motor 36 in a forward direction, the housing 11 rotates in the L direction, and when the mobile electronic device 10 rotates the vibration motor 36 in a reverse direction, the housing 11 rotates in the R direction. The housing 11 rotates in both the R direction and the L direction around the supporting point 42.

First, the control unit 22 of the mobile electronic device 10 switches, before the light emitting unit 34a of the projector 34 projects an image onto the projection surface 50, the distance measuring sensors 40 ON (Step S100). Each of the distance measuring sensors 40, which is on the front end of the housing 11, emits a measuring wave from the transmitting unit 40a in a direction substantially parallel to the left side or the right side of the angle of field of view and receives, by the receiving unit 40b, the measuring wave reflected from the projection surface 50. Then, the control unit 22 determines, based on measuring results of the distance measuring sensors 40, which distance to the projection surface is greater, the distance on the left side or the distance on the right side (Step S101).

If it is determined that the distance on the right side is greater, more particularly, the distance between the right-side distance measuring sensor 40 and the projection surface 50 is greater than the distance between the left-side distance measuring sensor 40 and the projection surface 50 (i.e., it is tilted like the mobile electronic device 10c of FIG. 4, i.e., it is shifted in the direction indicated by the outlined arrow R), the control unit 22 determines whether the distance on the right side is infinite (Step S102). If it is determined that the distance on the right side is not infinite (No at Step S102), the control unit 22 performs control such that the vibration motor 36 rotates for a predetermined time in the forward direction (Step S103). When the vibration motor 36 is rotated in the forward direction, the housing 11 is rotated in the L direction by an angle that corresponds to the predetermined time.

When the vibration motor 36 is rotated at Step S103, the control unit 22 measures again the distance to the projection surface 50 on the left side and the distance to the projection surface 50 on the right side by using the distance measuring sensors 40 and determines whether the difference between the distance on the left side and the distance on the right side is within a defined range (Step S104). The defined range, herein, is the difference between the distance on the left side and the distance on the right side that is measured when the angle is within a range possible to perform a software-based keystone correcting process. When the difference between the distance on the left side and the distance on the right side is within the defined range, a projected image becomes a first required image. When it is determined that the difference between the distance on the left side and the distance on the right side is within the defined range (YES at Step S104), the control unit 22 switches the distance measuring sensors 40 OFF (Step S105) and performs a software-based keystone correcting process (Step S106), and the process goes to end. The software-based keystone correcting process will be explained later.

When the control unit 22 measures at Step S104 the distance to the projection surface 50 on the left side and the distance to the projection surface 50 on the right side by using the distance measuring sensors 40 and it is determined that the difference between the distance on the left side and the distance on the right side is not within the defined range (No at Step S104), the process control goes back to Step S101. The control unit 22 then performs feedback control of rotation of the vibration motor 36 until the difference between the distance on the left side and the distance on the right side, which is indicated by the measuring results of the distance measuring sensors 40, becomes a value within the defined range.

If it is determined at Step S102 that the distance measured by the right-side distance measuring sensor 40 is infinite (Yes at Step S102), the control unit 22 determines that there is a high possibility that the projection region where an image is projected by the projector 34 is out of the projection surface 50 and displays a warning on the display 12 or the like for requesting the user to turn the light emitting unit 34a of the projector 34 to face the projection surface 50 (Step S107). The control unit 22 then switches the distance measuring sensors OFF (Step S108), and the process goes to end.

If it is determined at Step S101 that the distance on the left side is greater, more particularly, the distance between the left-side distance measuring sensor 40 and the projection surface 50 is greater than the distance between the right-side distance measuring sensor 40 and the projection surface 50 (i.e., it is tilted like the mobile electronic device 10b of FIG. 4, i.e., it is shifted in the direction indicated by the outlined arrow L), the control unit 22 determines whether the distance on the left side is infinite (Step S109). If it is determined that the distance on the left side is not infinite (No at Step S109), the control unit 22 performs control such that the vibration motor 36 rotates for a predetermined time in the reverse direction (Step S110). When the vibration motor 36 is rotated in the reverse direction, the housing 11 is rotated in the R direction by an angle that corresponds to the predetermined time.

When the vibration motor 36 is rotated in the reverse direction at Step S110, the control unit 22 measures again the distance to the projection surface 50 on the left side and the distance to the projection surface 50 on the right side by using the distance measuring sensors 40 and determines whether the difference between the distance on the left side and the distance on the right side is within the defined range (Step S104). The processes subsequent to Step S104 are the same as the processes described above.

If it is determined at Step S109 that the distance measured by the left-side distance measuring sensor 40 is infinite (YES at Step S109), the control unit 22 determines that there is a high possibility that the projection region where an image is projected by the projector 34 is out of the projection surface 50 and displays a warning on the display 12 or the like for requesting the user to turn the light emitting unit 34a of the projector 34 to face the projection surface 50 (Step S111). The control unit 22 then switches the distance measuring sensors OFF (Step S112), and the process goes to end.

Although, at Steps S103 and S110, the control unit 22 rotates the vibration motor 36 for a predetermined time, the predetermined time is preferably variable and the rotating time of the vibration motor 36 is preferably decreased each repetition of feedback. Because the control unit 22 moves the housing 11 greatly at the beginning of adjustment, a decrease in the adjustment time is enabled. Moreover, because the amount of adjustment is decreased as the adjustment error decreases, too much rotation of the housing 11 is prevented and control is performed such that the difference between the distance on the left side and the distance on the right side becomes a value within the defined range. It is allowable to cause the control unit 22 to perform control such that the tilt angle with respect to the projection surface (angle between the projection surface and the light projecting direction) is calculated based on the difference between the measured distances, then an angle is calculated that corresponds to the tilt angle of 90 degrees, and then the vibration motor 36 is vibrated to rotate the housing 11 by the calculated angle.

Figure 6:
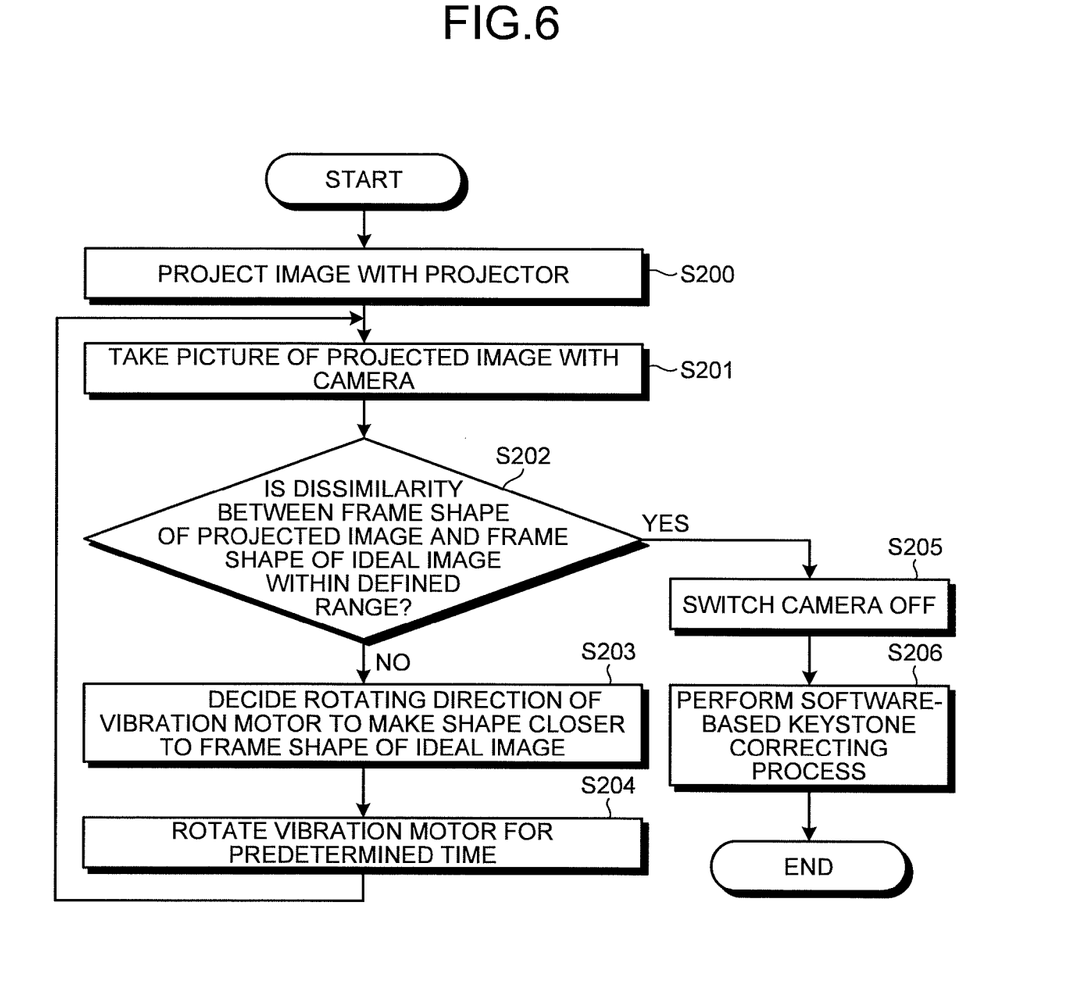
FIG. 6 is a flowchart of another example of an operation of the mobile electronic device.

Then, an operation of the mobile electronic device 10, more particularly, a control operation in which the housing 11 is rotated to a position possible to perform a software-based keystone correcting process will be explained with reference to FIG. 6. FIG. 6 is a flowchart of another example of the operation of the mobile electronic device. The flowchart illustrated in FIG. 6 is an example of control in which a picture of a projected image is taken by the camera 38 and the housing 11 is rotated such that the picture becomes a first required image possible to perform a software-based keystone correcting process.

First, the control unit 22 of the mobile electronic device 10 projects an image from the light emitting unit 34a of the projector 34 onto the projection surface 50 (Step S200). Then, the control unit 22 causes the camera 38 to take a picture of the projected image (Step S201).

The control unit 22 compares the frame shape of the projected image on the picture with the frame shape of an ideal image and determines whether the dissimilarity between them is within a defined range (Step S202), i.e., determines whether the projected image is a first required image. The frame shape of an ideal image is an image in which an image to be projected on the projection surface is entirely projected and there is no difference between the left side and the right side of the projected image (the left side and the right side of the frame of the projected image that extends in the direction perpendicular to the horizontal plane 52: the side 1 and the side r of the projected image 60a of FIG. 4), i.e., the length of the left side is equal to the length of the right side. Being within the defined range indicates that, for example, the ratio between the left side and the right side of the frame shape of a projected image (length of longer side÷length of shorter side) is within the limit possible to perform a software-based keystone correcting process. Therefore, the control unit 22 can process an image using a software-based keystone correcting process as long as the ratio between the left side and the right side is within the defined range (i.e., the image is a first required image). Although, in the present embodiment, the ratio between the left side and the right side is used, setting the defined range is not limited to the ratio between the left side and the right side. For example, it is allowable to compare the shapes of the entire frames and set the defined range by using a percentage of the mismatched area or it is allowable to set a range of the angle of a corner of the frame.

When, at Step S202, the control unit 22 compares the frame shape of the projected image on the picture with the frame shape of an ideal image and it is determined that the ratio of the image between the left side and the right side is not within the defined range (No at Step S202), the process control goes to Step S203 and the rotating direction of the vibration motor 36 is decided so that the shape becomes closer to the frame shape of an ideal image.

The control unit 22 performs control of rotation of the vibration motor 36 for a predetermined time based on the rotating direction decided at Step S203 (Step S204). Therefore, the housing 11 rotates around the supporting point 42 in the direction so as to become closer to the frame shape of an ideal image by an angle that corresponds to the driving time. When the control unit 22 rotates the vibration motor 36 at Step S204, the process control goes to Step S201: the camera 38 takes a picture of an image that is projected after the rotational movement, and the frame shape of the projected image on the picture is compared with the first required image. Steps S201 to S204 are repeated until the ratio between the left side and the right side becomes a value within the defined range.

If the control unit 22 determines at Step S202 that the ratio between the left side and the right side becomes a value within the defined range (Yes at Step S202), the process control goes to Step S205: the camera 38 is switched OFF (Step S205), then a software-based keystone correcting process is performed (Step S206), and then the process goes to end.

Then, the software-based keystone correcting process (second correcting process), which is performed, as described above, at Step S106 of FIG. 5 and Step S206 of FIG. 6, will be explained below. The second correcting process is performed after the first correcting process in which the vibration motor 36 is rotated so that the housing 11 is rotated to a position possible to perform the software-based keystone correcting process. When the housing 11 is placed on the horizontal plane 52 and an image is projected from the light emitting unit 34a of the projector 34 onto the projection surface 50, the control unit 22 of the mobile electronic device 10 performs the software-based keystone correcting process. The software-based keystone correcting process, herein, is a correcting process of correcting either or both of image data and a signal generated from image data, and it is also a process of correcting the projection timing of each pixel, the mirror scanning speed, and original image data so that an image closer to the original image data is projected on the projection surface. When the software-based keystone correcting process is performed, an image that has a difference between the distance on the left side and the distance on the right side within the defined range or an image that has a difference between the frame shape thereof and the frame shape of an ideal image within a defined range is corrected furthermore and an image displayed on the projection surface 50 becomes closer to a rectangular image. The software-based keystone correcting process can be implemented with various image processing methods.

As described above, the mobile electronic device 10 drives the vibration motor 36 based on a detected value, rotates the housing 11 in a desired direction, and changes the projection angle between the center of light emitted from the light emitting unit 34a of the projector 34 and the projection surface 50 closer to 90 degrees, thereby changing the projection environment closer to an environment possible to project an allowable image that is possible to perform the software-based keystone correcting process. Moreover, the mobile electronic device 10 can change an image displayed on the projection surface 50 closer to a rectangular image by performing the software-based keystone correcting process. Therefore, the mobile electronic device 10 of the present embodiment can project an image even under a projection environment impossible to project an allowable image even when the software-based keystone correcting process is performed (for example, the ratio between the left side and the right side is equal to or greater than 1.05). Therefore, the mobile electronic device 10 prevents projecting a distorted image and can project an easy-to-view image. Moreover, because the mobile electronic device 10 can control the attitude based on a detected result, the manipulation load on the operator is reduced and the attitude of the housing 11 is set properly regardless the level of skill of the operator.

Moreover, because the second correcting process (software-based keystone correcting process) is performed after the first correcting process, the mobile electronic device 10 can project an image much closer to an ideal image (image the same as original image data), i.e., a second required image on the projection surface. The second required image is, herein, an image that has no difference between the left side and the right side (the ratio between the left side and the right side is 1), i.e., an image that satisfies the condition that the difference between the left side and the right side is "0" or less than the defined range of Step S104 and/or Step S202. In other words, the second required image is an image that is projected in a state closer to the shape indicated by original image data (for example, a rectangle) than the shape of an allowable limit of Step S104 and/or Step S202. Moreover, even when the housing 11 is placed at a position to project an image aslant onto the projection surface 50, the mobile electronic device 10 can rotate the housing 11 to a position possible to perform the software-based keystone correcting process. Therefore, the mobile electronic device 10 can always project a projected image that is appropriately subjected to a software-based keystone correcting process onto the projection surface.

Moreover, because both the first correcting process and the second correcting process are used, the mobile electronic device 10 can project an image closer to the original image data on the projection surface, while decreasing a change in the rotating direction of the housing 11. Therefore, the mobile electronic device 10 can project an image closer to original image data, while decreasing the moving distance of the projection position from the initial projection position. Although the mobile electronic device 10 preferably performs the second correcting process because, as described above, the moving distance is decreased, the present invention is not limited thereto. It is allowable to perform only the first correcting process, i.e., perform only control of rotation of the housing 11. As described above, even when only the first correcting process is performed, if the allowable range is narrowed, the mobile electronic device 10 still can project an image much closer to the original image data.

Moreover, because, in the mobile electronic device 10 according to the present embodiment, the vibration motor 36, which generates vibration to give an announcement of an incoming call, doubles as a power source for rotating the housing 11, it is possible to form the housing small and light.

The control unit 22 preferably performs, during the second correcting process, not only a horizontal keystone correcting process but also a vertical keystone correcting process. When performing a vertical keystone correcting process by a software-based keystone correcting process, the control unit 22 can project an image much closer to the original image data on the projection surface. When a vertical keystone correcting process is performed, it is preferable that, before a keystone correcting process is performed, the ratio between the upper side and the lower side of an image that is projected onto the projection surface 50 (the upper side and the lower side of the frame of a projected image extending substantially parallel to the horizontal plane 52, i.e., the side u and the side d of the projected image 60a of FIG. 4) is corrected to a value equal to or less than a second predetermined value. The second predetermined value is, herein, the limit of the ratio between the upper side and the lower side of an image possible to perform a second correcting process, i.e., a software-based keystone correcting process. When an image is subjected to a keystone correcting process to become an image having a ratio equal to or less than the second predetermined value, the keystone correcting process is performed appropriately, and an image that is projected after the keystone correction is prevented from being a distorted image.

Although, in the present embodiment, the supporting point 42 is provided on the bottom surface at a projector-side position in the longitudinal direction and substantially at the center in the lateral direction, the position is not limited thereto. The supporting point 42 can be arranged at any position as long as the housing 11 is rotated by rotation of the vibration motor 36, and the supporting point 42 can be on the bottom surface of the housing 11 near the vibration motor 36 or at an end. Moreover, in the present embodiment, two or more of the supporting points 42 can be provided. It is preferable, in the present embodiment, for the purpose of proper control of rotation of the housing 11, that the supporting point 42 is provided; however, it can work without the supporting point 42.

Although, in the above embodiment, the defined range is a range possible to perform keystone correction, the present invention is not limited thereto. The defined range can be set as various allowable ranges as appropriately. For example, if an image is allowable so long as it is recognizable by the eyes, the allowable range is wide. If an image much closer to the original image is to be projected, the allowable range is narrow. Moreover, in the above embodiment, it is not necessary to increase the level of the software-based keystone correcting process possible to project an image that is the same as the original image and it is allowable to set a certain allowable range.

Figure 7A:
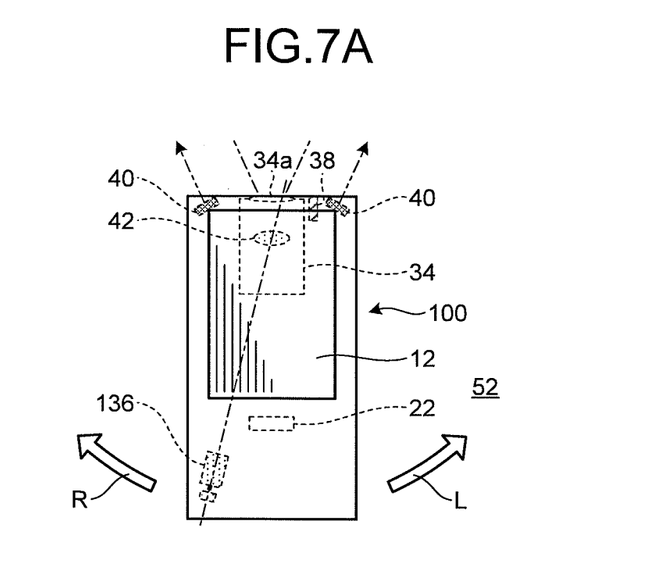
FIG. 7A is a plan view of a mobile electronic device according to another embodiment.
Figure 7B:
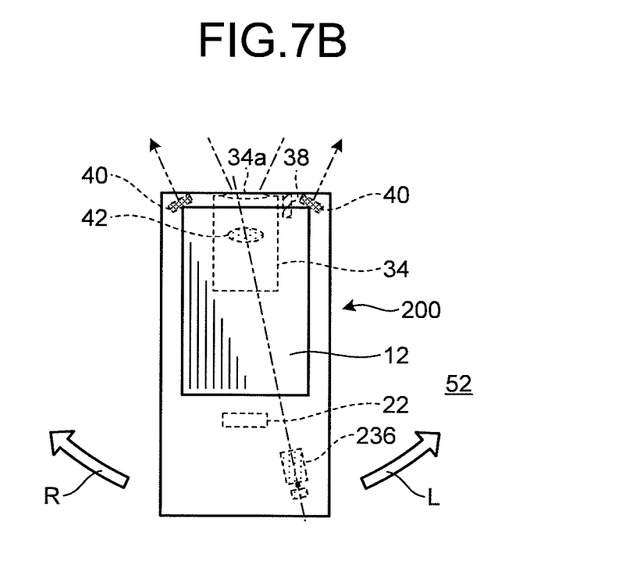
FIG. 7B is a plan view of a mobile electronic device according to another embodiment.

Moreover, the position at which the vibration motor 36 is arranged is not limited to the above embodiment. Another example of the position at the vibration motor 36 is arranged on the housing 11 will be explained with reference to FIGS. 7A and 7B. Each of FIGS. 7A and 7B is a plan view of a mobile electronic device according to another embodiment. The mobile electronic device illustrated in either FIG. 7A or FIG. 7B has almost the same configuration as that of the mobile electronic device 10 illustrated in FIG. 1 except the arrangement position of vibration motor. The same components are denoted with the same reference numerals and the explanation thereof is not repeated. The matters characteristic to the respective embodiments will be explained below.

A mobile electronic device 100 illustrated in FIG. 7A includes a vibration motor 136 that is near an end opposite to the end where the light emitting unit 34a is provided in the longitudinal direction of the bottom surface of the housing 11 and that is at the left end of the figure in the lateral direction of the bottom surface of the housing 11. The vibration motor 136 is arranged such that a line extended from the rotary shaft passes through the supporting point 42. A mobile electronic device 200 illustrated in FIG. 7B includes a vibration motor 236 that is near an end opposite to the end where the light emitting unit 34a is provided in the longitudinal direction of the bottom surface of the housing 11 and that is at the right end of the figure in the lateral direction of the bottom surface of the housing 11. The vibration motor 236 is arranged such that a line extended from the rotary shaft passes through the supporting point 42.

As described above, even when the vibration motor 136 or 236 is at a position that is not the center with respect to the lateral direction on the bottom surface, each of the mobile electronic devices 100 and 200 can rotate the housing 11 around the supporting point 42 in a direction indicated by the outlined arrow L or R by driving the vibration motor 136 or 236.

As illustrated in FIGS. 7A and 7B, the vibration motor is preferably arranged such that a line extended from the rotary shaft passes through the center of rotation of the housing 11 (e.g., the supporting point), i.e., the rotary shaft is perpendicular to the rotating direction indicated by the outlined arrow L or R. As described above, when the vibration motor is arranged such that the rotary shaft is perpendicular to the rotating direction indicated by the outlined arrow L or R, because the driving force generated by the vibration motor is efficiently transmitted in the rotating direction, the housing 11 is rotated efficiently. Moreover, this arrangement of the vibration motor can prevent the housing from moving in a direction other than the rotating direction, which enables an easier control of the angle of the housing 11. Moreover, this arrangement of the vibration motor just needs adjustment of the angle of the rotary shaft but allows an arbitrary mounting position inside the housing 11; therefore, the degree of freedom is high when components are arranged inside the housing 11.

Moreover, the supporting point and the vibration motor are preferably arranged such that the barycenter of the housing (mobile electronic device) 11 lies between the supporting point and the vibration motor. When, as described above, the barycenter lies between the supporting point and the vibration motor, because the driving force (torque) generated by the vibration motor is efficiently transmitted to the contact area, the housing 11 is rotated efficiently.

Although, in any of the above embodiments, the supporting point 42 is arranged at the front end of the mobile electronic device near the projector 34, and the vibration motors (36, 136, and 236), which function as the driving unit, are arranged at the back end, they can be arranged in the opposite manner. In other words, it is allowable, as another embodiment, to arrange a vibration motor near the front end and arrange a supporting point at the back end. With another embodiment configured as described above, basically, the supporting point on the back end side becomes the center around which the housing rotates and the projecting direction of the projector 34 is changed by rotating the front end side.

Although, the mobile electronic device 10 of the present embodiment uses, as a moving mechanism (driving source) for rotating the housing 11, the vibration motor 36 to vibrate the housing 11, the moving mechanism for rotating the housing 11 is not limited thereto. For example, a mechanism can be used that is a combination of a wheel and a driving source that rotates the wheel.

Moreover, by arranging the supporting point 42 and the vibration motor 36 near the front end and the back end in the longitudinal direction of the box-shaped housing 11 and by rotating the vibration motor 36 around the supporting point 42, the mobile electronic device 10 of the above embodiment rotates the housing 11, thereby performing correction of the projecting direction of the projector 34 (first correcting process). However, the present invention is not limited thereto and it is allowable to move the housing 11 in a direction other than the rotating direction. It is allowable, for example as another embodiment, to perform parallel movement, rotational movement, or zig-zag movement of the housing by mounting a plurality of vibration motors on the housing of the mobile electronic device as a moving mechanism (position changing unit, moving unit) and controlling by the control unit one or more vibration motor selected from the vibration motors. With the embodiment, because it is possible to move the housing in a direction other than the rotating direction in the above manner, the housing is moved to a desired position and in a desired direction, which makes it possible to adjust the projecting direction and the projection position of an image projected by the projector more accurately and more appropriately.

Although, in the above embodiments, the projecting direction of the projector is adjusted by moving the housing by using a moving mechanism, the present invention is not limited thereto. If, for example, a mobile phone having a wireless communication function is used, the moving mechanism can be used not only to change the projecting direction of the projector but also to turn the housing in a direction with good reception on radio wave or to move the housing to the operator when receiving a come-here instruction. Moreover, if a mobile phone having a solar power generation function is used, the moving mechanism can be used to turn the housing so as to always point toward the sun, i.e., move the housing to a position possible to generate electric power efficiently. Moreover, as described above, because of easy device configuration and capability of further utilizing, it is preferable to use the vibration motor as a driving source; however, it is possible to use a moving means other than the abovementioned vibration motor.

Moreover, in the above embodiment, the vibration motor 36 is used as both an incoming-call announcement unit and a driving source (moving mechanism). Therefore, if the vibration motor 36 is used as an incoming-call announcement unit, it is preferable to periodically reverse the rotating direction of the rotary shaft, i.e., switch the rotating directions. If, as described above, the rotating directions are switched, an announcement of an incoming call is given while the amount of rotation of the housing 11 is suppressed, i.e., the attitude of the housing 11 is prevented from changing by a predetermined angle or more.

In the flowchart of FIG. 5 of the above embodiment, when it is determined at Steps S102 and S109 that the measured distance is infinite, the control unit 22 displays a warning (see Steps S107 and S111); however, the present invention is not limited thereto. For example, it is allowable to cause the control unit 22 to skip displaying a warning and detect a position to decrease the distance to a finite value by rotating the housing using the vibration motor 36 in the same direction each of a certain angle, for example, from 60 degrees to 90 degrees. In other words, the control unit 22 can perform control such that a direction in which the projection surface is present is detected by rotating the housing 11. As described above, because the mobile electronic device performs control such that the device itself detects the projection surface, the user does not need to adjust the angle of the housing and the load on the user is reduced.

Although, in the above embodiment, in order to accurately detect the angle between the projecting direction of the projector and the projection surface, two distance measuring sensors are arranged so as to measure the distance to the projection surface in a direction parallel to each end of the angle of the projection field of the projector, the present invention is not limited thereto. As long as the mobile electronic device can detect the positional relation between the projection surface and the projecting direction of the projector on a plane parallel to the top surface, a left-right asymmetric arrangement is allowable. Moreover, it is allowable to measure the distance at an angle different from the angle of each end of the angle of field of view.

Industrial Applicability

As described above, a mobile electronic device and a mobile phone according to the present invention is useful for a device that has an image projecting function, such as a projector.

The invention claimed is:
1. A mobile electronic device comprising:
a housing that is placed on a supporting surface;
a projecting unit for projecting an image, the projecting unit being mounted on the housing;
a detecting unit for detecting a positional relation between the projecting unit and a projection surface on which an image projected by the projecting unit is to be displayed;
a housing position changing unit for changing a position of the housing relative to the supporting surface via a mechanical actuator located in the housing, the mechanical actuator being separate from the projecting unit; and a control unit for controlling the position changing unit on the basis of the positional relation between the projecting unit and the projection surface detected by the detecting unit.

2. The mobile electronic device according to claim 1, wherein the position changing unit is a rotating unit for rotating, while maintaining the housing being on a supporting surface, the housing around a rotating axis that extends in a direction that crosses the supporting surface.

3. The mobile electronic device according to claim 2, wherein the detecting unit is an imaging unit for taking a picture of an image to be projected by the projecting unit onto the projection surface, and the control unit performs a first correcting process to process an image to be projected by the projecting unit onto the projection surface into a first required image, by controlling a drive of the rotating unit on the basis of an image taken by the imaging unit such that the drive of the rotating unit causes the housing to be rotated.

4. The mobile electronic device according to claim 3, wherein, the control unit performs a second correcting process to correct either or both of image data and a signal generated from the image data in such a manner that an image to be projected by the projecting unit onto the projection surface is processed into a second required image, before the projecting unit performs projection.

5. The mobile electronic device according to claim 4, wherein, the control unit performs the second correcting process after performing the first correcting process.

6. The mobile electronic device according to claim 4, wherein, the first required image is a quadrangular image in which a quadrangular image to be projected onto the projection surface is entirely projected and the ratio between two sides of the projected quadrangular image that extend substantially perpendicular to the supporting surface is equal to or less than a first required value, and the second required image is a quadrangular image in which a quadrangular image to be projected onto the projection surface is entirely projected and the ratio between two sides of the projected quadrangular image that extend substantially perpendicular to the supporting surface is equal to or greater than 1 and less than the first required value.

7. The mobile electronic device according to claim 6, wherein, the second required image is a quadrangular image in which a quadrangular image to be projected onto the projection surface is entirely projected and the ratio between two sides of the projected quadrangular image that extend substantially parallel to the supporting surface is equal to or less than a second required value.

8. The mobile electronic device according to claim 3, wherein the first required image is a quadrangular image in which a quadrangular image to be projected onto the projection surface is entirely projected and the ratio between two sides of the projected quadrangular image that extend substantially perpendicular to the supporting surface is equal to or less than a first required value.

9. The mobile electronic device according to claim 2, wherein the detecting unit is a distance measuring unit that measures a first distance between the projecting unit and the projection surface on one side when an angle of a projecting direction of the projecting unit with respect to the center on a direction parallel to the supporting surface is substantially equal to an angle at one end of a field in which the projecting unit can project an image and measures a second distance between the projecting unit and the projection surface on the other side when an angle of a projecting direction of the projecting unit with respect to the center on a direction parallel to the supporting surface is substantially equal to an angle at the other end of the field in which the projecting unit can project an image, and the control unit controls the rotating unit such that the difference between the first distance and the second distance measured by the distance measuring unit is reduced.

10. The mobile electronic device according to claim 2, wherein the rotating unit is inside the housing, and causes the housing to be rotated by rotating a rotary body.

11. The mobile electronic device according to claim 10, wherein the rotating unit also has an announcement function of giving an announcement by rotating the rotary body to vibrate the housing, and the control unit periodically reverses a rotating direction of the rotary body to give the announcement.

12. The mobile electronic device according to claim 11 further comprising a communication unit, wherein when the communication unit receives an incoming call, the control unit activates the announcement function of the rotating unit.

13. The mobile electronic device according to claim 2, further comprising a protruding portion on a first main surface that faces the supporting surface when the housing is placed on the supporting surface, and the protruding portion is the center of rotation when the housing is rotated.

14. The mobile electronic device according to claim 13, wherein the housing further includes a sound emitting unit for outputting a sound, and the sound emitting unit is arranged such that the sound emitting is in a space to be formed between the first main surface and the supporting surface when the housing is placed on the supporting surface.

15. The mobile electronic device of claim 1, wherein the mechanical actuator is configured to create a force that moves the housing relative to the surface.

16. A mobile phone comprising:
a housing to be placed on a supporting surface;
a communication unit that is mounted on the housing;
a vibrating unit for rotating an eccentric rotary body located in the housing to vibrate the housing;
a telephone unit for makes a telephone call when the communication unit receives an incoming call; and
a control unit for performing control of rotation of the rotary body of the vibrating unit, wherein
the control unit moves the housing relative to the supporting surface by rotating the rotary body of the vibrating unit, and the control unit controls a moving direction of the housing that is on the supporting surface by controlling a rotating direction of the rotary body.

17. The mobile phone according to claim 16, wherein when the communication unit receives an incoming call, the control unit rotates the rotary body by switching rotating directions alternately, thereby vibrating the housing.

* * * * *